United States Patent [19]

Reitmeier

[11] Patent Number: 4,626,895
[45] Date of Patent: Dec. 2, 1986

[54] SAMPLED DATA VIDEO SIGNAL CHROMINANCE/LUMINANCE SEPARATION SYSTEM

[75] Inventor: Glenn A. Reitmeier, Trenton, N.J.

[73] Assignee: RCA Corporation, Princeton, N.J.

[21] Appl. No.: 736,970

[22] Filed: May 22, 1985

Related U.S. Application Data

[63] Continuation-in-part of Ser. No. 639,094, Aug. 9, 1984, abandoned.

[51] Int. Cl.$^4$ ............................................. H04N 9/64
[52] U.S. Cl. ...................................................... 358/31
[58] Field of Search ........................................... 358/31

[56] References Cited

U.S. PATENT DOCUMENTS

| | | | |
|---|---|---|---|
| 2,921,124 | 1/1960 | Graham | 178/6 |
| 4,050,084 | 9/1977 | Rossi | 358/31 |
| 4,307,420 | 12/1981 | Ninomiya et al. | 358/136 |
| 4,343,017 | 8/1982 | Wilkinson | 358/31 |
| 4,361,853 | 11/1982 | Remy et al. | 358/167 |
| 4,437,119 | 3/1984 | Matsumoto et al. | 358/136 |
| 4,466,016 | 8/1984 | Pritchard | 358/31 |
| 4,524,423 | 6/1985 | Acampora | 358/31 |

FOREIGN PATENT DOCUMENTS 2072991 10/1981 United Kingdom .
2138243A 4/1983 United Kingdom .

OTHER PUBLICATIONS

A. Kaiser, "Comb Filter Improvement with Spurious Chroma Detection", SMPTE Journal, vol. 86, No. 1, Jan. 1977, pp. 1-5.
Schönfelder, "Verbesserung der PAL-Bildqualität Durch Digitale Interframetechnik", Fernsch-und Kino Technik, vol. 38, Jan. 1984, pp. 231-238.

*Primary Examiner*—Michael A. Masinick
*Attorney, Agent, or Firm*—E. M. Whitacre; P. J. Rasmussen; E. P. Herrmann

[57] ABSTRACT

An adaptive system for separating chrominance and luminance components from composite video includes a delay element having a central output tap and pairs of further output taps symmetrically disposed about said further tap. Samples from each pair of taps are subtractively combined, filtered and scaled. These samples are then applied to a decoder which determines the pair of taps providing the smallest filtered and scaled difference. Samples from the pair of taps generating the smallest difference and samples from the central output tap are then combined to produce either comb filtered chrominance/luminance or bandpass/lowpass filtered chrominance/liminance.

15 Claims, 5 Drawing Figures

SAMPLED DATA VIDEO SIGNAL CHROMINANCE/LUMINANCE SEPARATION SYSTEM

This is a continuation-in-part of application Ser. No. 639,094, filed Aug. 9, 1984 now abandoned.

This invention relates to the separation of luminance and chrominance components of composite video and more particularly to adaptive filter means for reducing the inclusion of cross color or motion induced artifacts in the separated signals.

Traditionally chrominance and luminance components of composite video are separated with either bandpass or lowpass filters or with comb filters to extract the appropriate spectral components from the composite signal. The former technique undesirably deletes the higher frequency components of luminance signal and fails to remove high frequency luminance from the chrominance component. The latter technique produces wideband luminance and luminance-free chrominance for the majority of video signals, but introduce artifacts in both separated components under certain signal conditions. For example, an interline comb filter produces lines of alternating light and dark dots (hanging dots) whenever a line-to-line chrominance transition occurs. Interframe comb filters generate secondary or phantom images whenever the image to be reproduced changes. Thus, there is a need for a system to separate the components of composite video that does not undesirably limit the frequency response of the component signals or that does not introduce significant signal artifacts.

Rossi, in U.S. Pat. No. 4,050,084, describes an adaptive comb filter system which (a) bandpass filters composite video to produce the chrominance component, (b) comb filters the chrominance component to eliminate high frequency luminance therefrom, and (c) subtracts the comb filtered chrominance from composite video to generate the luminance component. The comb filter in the Rossi system actually includes three interline comb filters which are selectably accessed depending upon which filter is less likely to introduce artifacts for the video signal currently being processed. The selection process is one in which signals representing vertically aligned pixels are compared. The results of the comparisons are then tested against a reference value. The filters are then hierarchically selected on the basis of the secondary comparison.

The Rossi system is advantageous in that it tends to eliminate hanging dots, but fails to correct other comb filter deficiencies of the interline comb filter, e.g. loss of resolution along diagonal lines.

It is an object of the present invention to generate separated chrominance and luminance components from composite video with fewer artifacts than is possible with currently available systems.

SUMMARY OF THE INVENTION

The present invention is an adaptive filter including delay means providing a plurality of signals symmetrically displaced in time about a central signal tap. Pairs of symmetrically spaced signals are summed and selectively combined with signal from the central tap to produce separated luminance and chrominance signals. The pairs of signals that are respectively summed are also subtractively combined to generate difference signals. The difference signals are compared to produce a control signal for controlling the selection process.

DETAILED DESCRIPTION

In the drawings wide arrows denote multiple wire busses for conducting parallel bit digital codewords, and narrow arrows denote single conductor connections. The invention will be described in terms of digital signals and digital hardware but is applicable to sampled data analog signals as well.

Assume a sample rate of four times the color subcarrier frequency. For composite video sampled at four times the subcarrier frequency, samples separated by four sample periods occur at like sampling phases. Consider signal representing a particular pixel to be designated p(i, j) where the index "i" indicates its position along a horizontal line and the index "j" indicates the horizontal line number. Luminance signal may be derived from the sampled composite video signal by cancellation of the modulated subcarrier. This is achieved by averaging pixels along a horizontal line that are two pixels to the right and left of a given pixel according to the following equation:

$$L(i, j)_p = \tfrac{1}{4}p(i-2, j) + \tfrac{1}{2}p(i, j) + \tfrac{1}{4}p(i+2, j) \qquad (1)$$

where $L(i, j)_p$ represents a separated luminance sample for pixel point (i, j).

Separated luminance samples may also be produced by averaging samples which are vertically displaced owing to the 180 degree phase displacement of the color subcarrier line-to-line. In this instance luminance signal is derived according to the equation:

$$L(i, j)_H = \tfrac{1}{4}p(i, j-1) + \tfrac{1}{2}p(i, j) + \tfrac{1}{4}p(i, j+1). \qquad (2)$$

Equation (2) describes the conventional 2-H comb filter.

From frame-to-frame the color subcarrier exhibits a 180 degree phase relationship, thus permitting luminance separation by pixel averaging over two frame intervals. In this instance $$L(i, j)_{Fr} = \tfrac{1}{4}p(i, j-525) + \tfrac{1}{2}p(i, j) + \tfrac{1}{4}p(i, j+525) \qquad (3)$$

for NTSC signals wherein one frame contains 525 lines.

Pixels from adjacent fields may also be averaged to produce separated luminance signal, i.e.

$$L(i, j)_{FD} = \tfrac{1}{4}p(i, j-263) + \tfrac{1}{2}p(i, j) + \tfrac{1}{4}p(i, j+263). \qquad (4)$$

The chrominance signal, C(i, j), corresponding in time to any of the foregoing calculated luminance signals is derived by subtracting the luminance sample from the composite sample, i.e.

$$C(i, j) = p(i, j) - l(i, j). \qquad (5)$$

For example, the chrominance signal associated with luminance samples determined using equation (2) is described by the equation:

$$C(i,j)_H = -\tfrac{1}{4}p(i,j-1) + \tfrac{1}{2}p(i,j) - \tfrac{1}{4}p(i,j+1). \tag{6}$$

which is the equation for the chrominance response of the familiar 2H comb filter.

Separated signals developed via the foregoing algorithms will each exhibit artifacts under particular signal conditions. The line and field averaged samples will produce hanging dots for vertical chrominance transitions, the field and frame averaged samples will exhibit phantom images for moving images, etc. The adaptive system will select the best method to use at each pixel or alternatively for whole line, field or frame intervals.

When the video signal represents non-moving images, perfectly separated chrominance and luminance signals may be derived from composite video using an interframe comb filter as per equation (3). When slight motion occurs, the field comb approach (equation (4)) generates more artifact free separate chrominance/luminance. For more rapidly moving images, the interline comb (equation (2)) generally produces better chrominance/luminance. Finally, for images containing significant motion and horizontal lines, the equation (1) system will produce the more acceptable signals.

Figure 1:
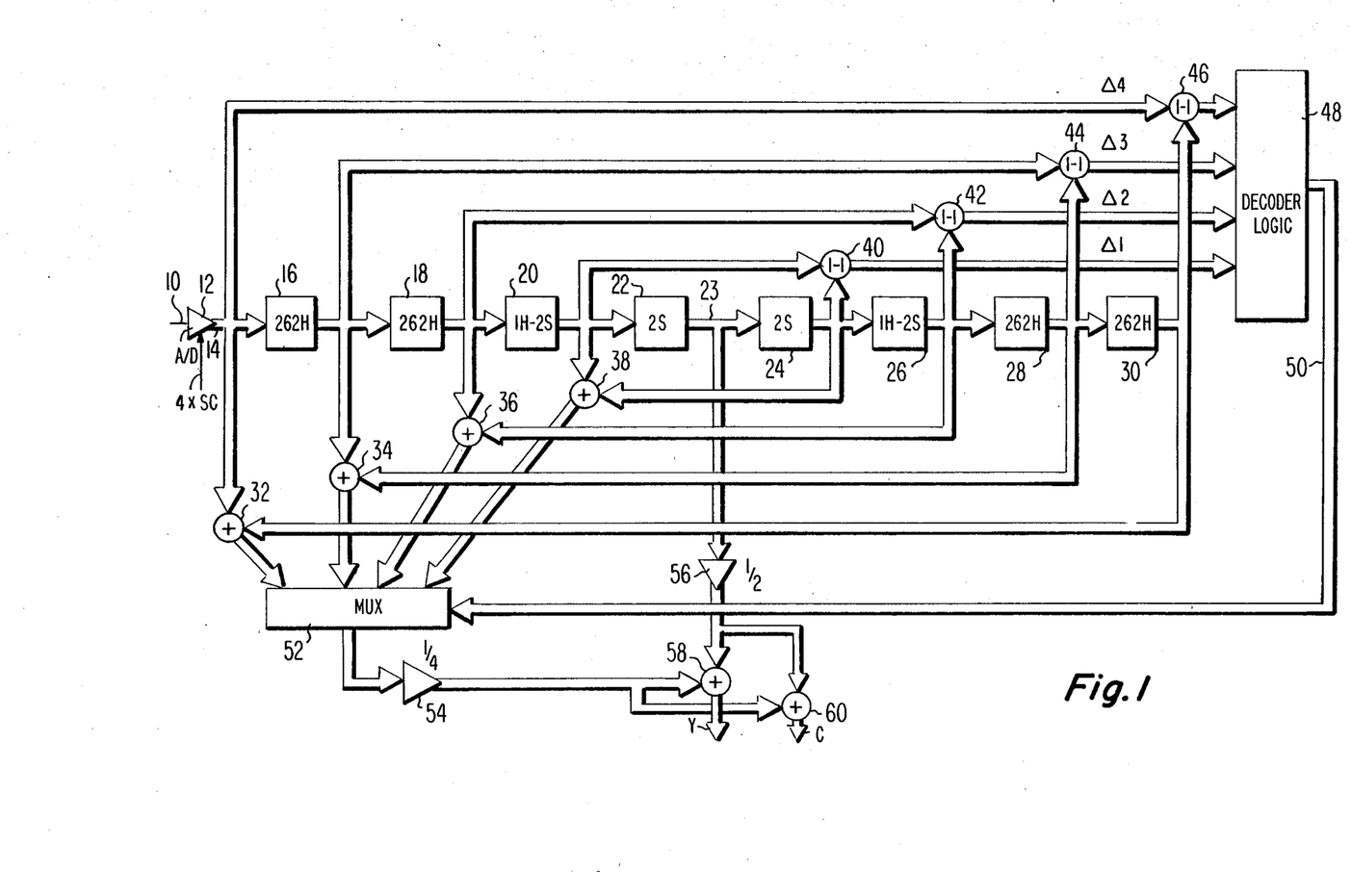
FIG. 1, 4 and 5 are block diagrams of adaptive chrominance/luminance separation systems embodying the present invention.

Referring to FIG. 1, analog composite video from e.g. a conventional television receiver tuner/detector circuit is applied to the input terminal, 10, of an analog-to-digital (A/D) converter 12. The A/D converter is clocked with a signal phase and frequency locked to the color subcarrier at four times the subcarrier frequency. A/D converter 12 produces digital representations, e.g. binary pulse code modulates signals, of the analog composite video signal on bus 14 which samples occur at the sample rate of four times subcarrier frequency. (Phase and frequency locked sampling to subcarrier is known to those skilled in the art of digital TV design and will not be discussed further.) The digital samples from the A/D converter are applied to the cascade connected delay elements 16-30. Delay elements 16-30 are symmetrically disposed about a central signal tap 23. The delay period generated by delay elements 16-22 between the input bus 14 and the central tap is 525 horizontal line periods or one frame time. The total delay provided by all delay elements 16-30 is therefore two frame times. The number of delay elements or total delay time illustrated in FIG. 1 was chosen for illustrative purposes. Greater or lesser numbers of elements or delay intervals may be utilized to practice the invention.

On either side of the central tap 23 are delay elements 22 and 24 each of which provides a delay of two sample periods. If the central tap represents pixel p(i, j), the sample at the input to element 22 represents pixel p(i+2, j) and the sample at the output of element 24 represents pixel p(i−2, j).

Symmetrically disposed about the center tap and connected to delay elements 22 and 24 are delay elements 20 and 26 respectively. Delay elements 20 and 26 each provide a signal delay period of two sample periods less than one horizontal line period. The signals at the input of delay element 26 are displaced in time by exactly one horizontal line period from the signal at the central tap. These signals represent samples p(i, j+1) and p(i, j−1) respectively relative to the sample p(i, j) at the center tap.

Symmetrically disposed about the center tap 23 and connected to elements 20 and 26 are delay elements 18 and 28. Delay elements 18 and 28 each provide a signal delay period of 262 horizontal lines. The total delay provided by delay elements 18, 20 and 22 (24, 26 and 28) is 263 horizontal line periods or approximately one field period. The samples at the input to delay element 18 and the output of delay element 28 represent pixels p(i, j+263) and p(i, j−263) respectively. Similarly delay elements 16 and 30 are symmetrically connected to delay elements 18 and 28, each of which provides a delay of 262 horizontal lines. The signal at the input to delay element 16 (on bus 14) and the output of delay element 30 represent pixels p(i, j+525) and p(i, j−525) respectively. It is seen that delay elements 16-30 make available all of the samples required for performing the algorithms indicated by equations (1) to (6).

Samples representing pixels p(i, j±N) are added together in adders 32-36. For example, the input to delay element 16 and the output of delay element 30 are summed in adder 32 developing the sum p(l, j+525)+p(i, j−525). The sums output by adders 32-36 are applied to respective input ports of multiplexor 52. Samples representing pixels p(i±2S, j) at the input to delay element 22 and the output of delay element 24 (S equal to an integer) are applied to adder 38 which produces the sample sums p(i+2S, j)+p(i−2S, j). Output sums from adder 38 are applied to a further input port of multiplexor 52.

Multiplexor 52, responsive to control signals on bus 50, selectively applies sums from adders 32-38 to scaling circuit 54. Scaling circuit 54 weights samples applied therto by a factor of one-quarter. Output samples from scaling circuit 54 are applied as addends to adder 54 and as subtrahends to subtractor 60.

Samples p(i, j) from the central tap 23 are applied to scaling circuit 56 which weights samples applied therto by one-half. Scaled samples from circuit 56 are applied as addends to adder 58 and minuends to subtractor 60. Adder 58 provides samples corresponding to luminance signals described by equations (1) to (4). Subtractor 60 provides difference samples corresponding to chrominance signals equivalent to those described by equation (5). The luminance and chrominance samples from adder 58 and subtractor 60 are applied to circuitry (not shown) for further processing, e.g. for developing R, G, B signals for driving a kinescope.

Pairs of samples applied to adders 32, 34, 36 and 38 are also applied respectively to subtraction circuits 46, 44, 42 and 40. Subtraction circuits 40-46 develop the magnitudes of the difference between the samples applied to the respective subtraction circuit. The difference signal, Δ1, from subtraction circuit 40 is an indication of the relative desirability of using sums developed by adder 38 in producing separated luminance and chrominance samples for a particular pixel. Similarly differences, Δ2, Δ3 and Δ4, produced by subtraction circuits 42, 44 and 46 are indications of the relative desirability of using sums developed by adders 36, 34 and 32 respectively.

The magnitudes of the differences from subtraction circuits 40-46 are applied to decoder logic circuit 48 which develops a control signal on bus 50 indicative of which pair of samples exhibits the smallest difference. The control signal, via multiplexor 52, selects the sum signal from the adder circuit associated with the sample pair exhibiting the smallest difference.

Figure 2:
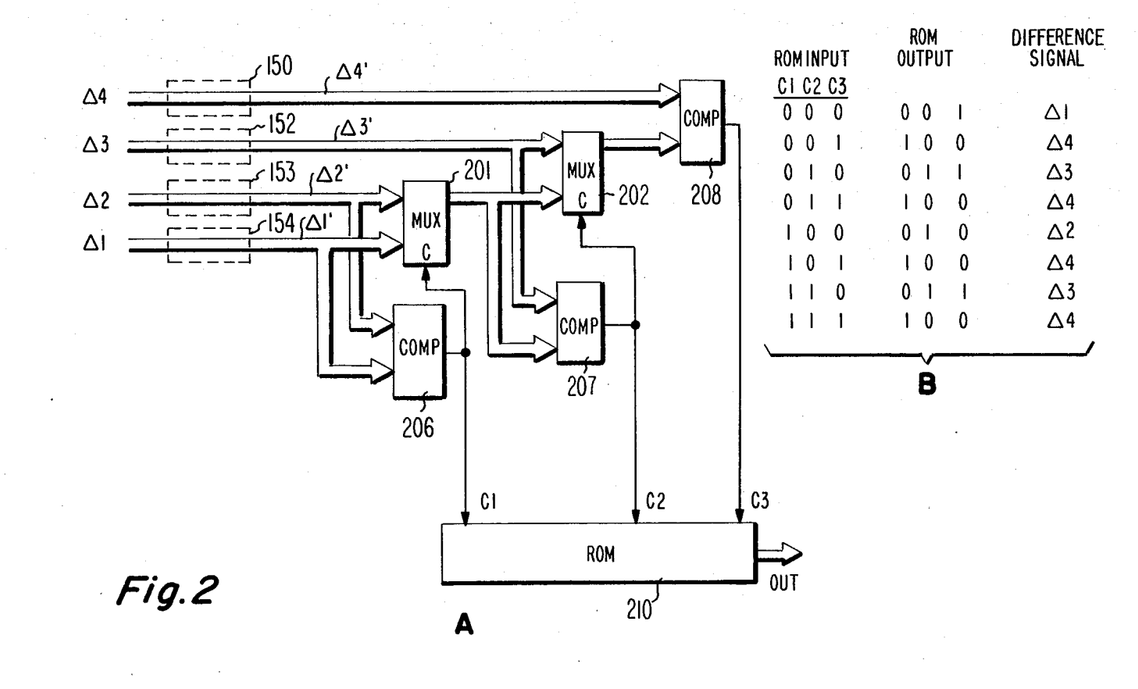
FIG. 2 is a partial block/partial logic schematic diagram of control circuitry for use with the FIG. 1 apparatus.

FIG. 2A illustrates a decoder which may be implemented for the decoder logic 48 of FIG. 1. Before actual decoding the difference magnitudes Δ1, Δ2, Δ3 and Δ4 from subtraction elements 40, 42, 44 and 46 respectively may be preconditioned in elements 154, 153, 152 and 150 shown as dashed boxes. Elements 150 to 154 may integrate samples over predetermined intervals, may scale the respective samples or filter the respective samples. These elements will be considered further below. For the present, assume that elements 154 to 150 produce the samples Δ1' to Δ4'.

The FIG. 2A circuit shown is for determining which of four difference signals is smallest but may readily be expanded to greater numbers of difference signals or contracted for a lesser number of signals. The circuit includes two 2-to-1 multiplexors 201–202, three two-input comparators 206–208 and a ROM 210. Two difference signals Δ1' and Δ2' are applied to the two input ports of multiplexor 201 and to the two input ports of comparator 206. Comparator 206 produces an output on connection C1 which is a logic 1 if signal Δ2' is less than Δ1' and a zero otherwise. Responsive to the signal on connection C1, multiplexor 201 passes the smaller of signals Δ1' and Δ2' to one input port of multiplexor 202 and one input port of comparator 207. Difference signal Δ3' is applied to the second input ports of multiplexor 202 and comparator 207. Comparator 207 produces a signal on connection C2 which is a logic 1 if signal Δ3' is less than the signal from multiplexor 201 and a logic zero otherwise. Responsive to the signal on connection C2 multiplexor 202 passes the lesser of the two difference signals applied to its input ports to one input port of comparator 208. Difference signal Δ4' is applied to the second input port of comparator 208 which outputs a logic one on connection C3 if signal Δ4' is the smaller of the two signals and a zero otherwise.

The output signals from comparators 206–208 are applied to ROM 210 which produces a three bit output code indicating which difference signal is the smallest. FIG. 2B indicates one manner in which the ROM may be encoded wherein the ROM output represents in binary form the number of the smallest difference signal, e.g. a binary 1 for signal Δ1' or a binary 4 for signal Δ4'. Note, however, that ROM 210 may be eliminated by incorporating the appropriate decoding in multiplexor 52 of FIG. 1. Alternatively combinatorial logic may be substituted for the ROM, such logic being arranged to produce the requisite codewords for the multiplexor. It should also be appreciated that to accommodate inherent delays in the comparator circuits, that the successive comparators and multiplexors may have to be operated in "pieplined" fashion for particular applications.

If two of the difference signals are equal, in general, it does not matter which is selected by a particular comparator and passed by the corresponding multiplexor. However, if all of the difference signals are equal and of relatively large value, indicating poor correlation of signal between lines of video signal, it may be preferrable to default to a particular filter function. In the apparatus of FIG. 2A the system defaults to the filter function corresponding to estimation signal Δ1'. This occurs because for signals Δ1' and Δ2' being equal, comparator 206 generates a logic zero output and multiplexor 201 passes signal Δ1'. Signals Δ1' and Δ3' being equal, comparator 207 produces a logic zero output and multiplexor 202 passes signal Δ1', etc. Therefore, the preferred default function for equal estimation signals is arranged to be associated with the input position indicated as Δ1' in FIG. 2A.

An alternative decoder arrangement may not incorporate the use of difference signal Δ1' from subtractor 40 at all, but for equal difference signals Δ2, Δ3 and Δ4 simply default to the separated chrominance and luminance signals, otherwise associated with samples supplied to subtraction circuit 40. Thirdly, a threshold detector may be added to determine when the value of all the difference signals are both equal and small in which case it would be more appropriate to default to the separation function associated with e.g. difference signal Δ4'.

Figure 3:
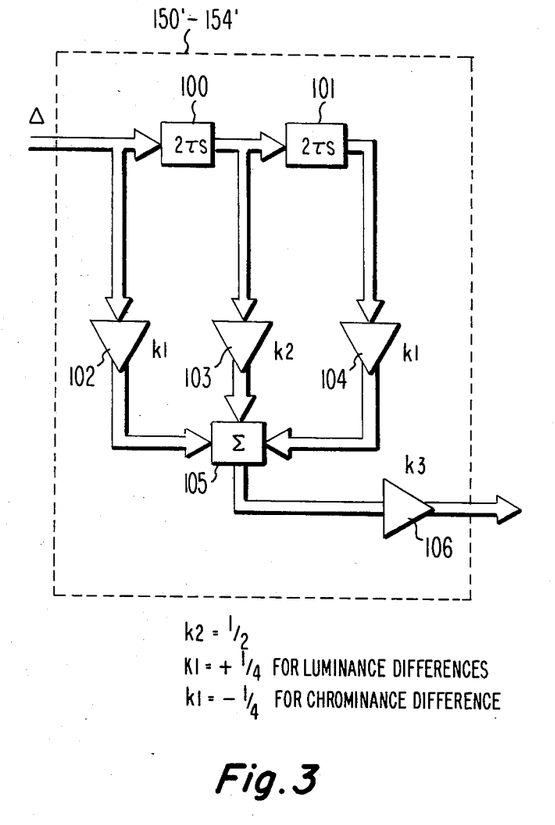
FIG. 3 is a block diagram of preconditioning circuitry for conditioning difference signals used in the decoding process of FIGS. 1, 2 and 4.

FIG. 3 illustrates exemplary circuitry which may be incorporated into preconditioning circuits 150 to 154. The circuitry includes a filter function (100–105) and a scaling circuit 106. The filter includes two cascade connected delay elements 100 and 101 each providing a delay of two sample periods. The input samples to delay element 100 and output samples from delay element 101 are respectively applied to like weighting circuits 102 and 104 respectively. Samples from the output of delay element 100 are applied to weighting circuit 103 and weighted samples from elements 102–104 are summed in adder 105. The weighting coefficient K1 associated with circuits 102 and 104 is ±¼ and the coefficient K2 associated with circuit 103 is equal to ½. If K1 is +¼ the filter is a notch filter which eliminates the band of frequencies about the subcarrier. The filtered difference signals will therefore be primarily related to luminance transitions. Alternatively if K1 is −¼ the filter is generally a bandpass filter centered about the subcarrier frequency. In this instance the difference signals will be primarily related to chrominance transitions.

Determination of which type of filter to use, if any, is subjective and a function of the preferences of the system designer. However, regarding interline comb filters, hanging dots produced by interline chrominance transitions tend to be the more objectionable artifacts created thereby. Therefore, it is generally more appropriate to employ a bandpass filter in the difference signal line Δ2 associated with the line comb so that samples Δ2 are primarily a function of the chrominance component. In this instance the coefficients K1 of circuit 153 would be −¼. For field and frame combs, luminance changes tend to create more objectionable artifacts (phantom images and trailing color dots) thus, notch filters are probably best employed for difference signals Δ3 and Δ4. The coefficients K1 in circuits 152 and 150 would therefore be +¼. No preconditioning filter is probably best for difference signal Δ1.

Note that where the applied samples are binary values weighting circuits 102, 103 and 104 may be simple hardwired bit shifts. For coefficients of ½ and ¼ respectively, the codewords need merely be shifted one and two bit positions rightward.

The order in which the separation filters tend to produce the worst or most disturbing artifacts, in descending order, is frame comb, field comb, line comb and the bandpass/lowpass filter. Thus, it is beneficial to weight the difference signals applied to the decoder. For example, signals Δ1, Δ2, Δ3 and Δ4 may be scaled by the factors K3 of 1, 1.125, 1.25 and 1.375 respectively. Again, selection of weighting factors is highly subjective and the foregoing values are to be construed as only exemplary. Where practical, the scaling circuit 106 may be eliminated and the factor K3 incorporated into coefficients K1 and K2.

Figure 4:
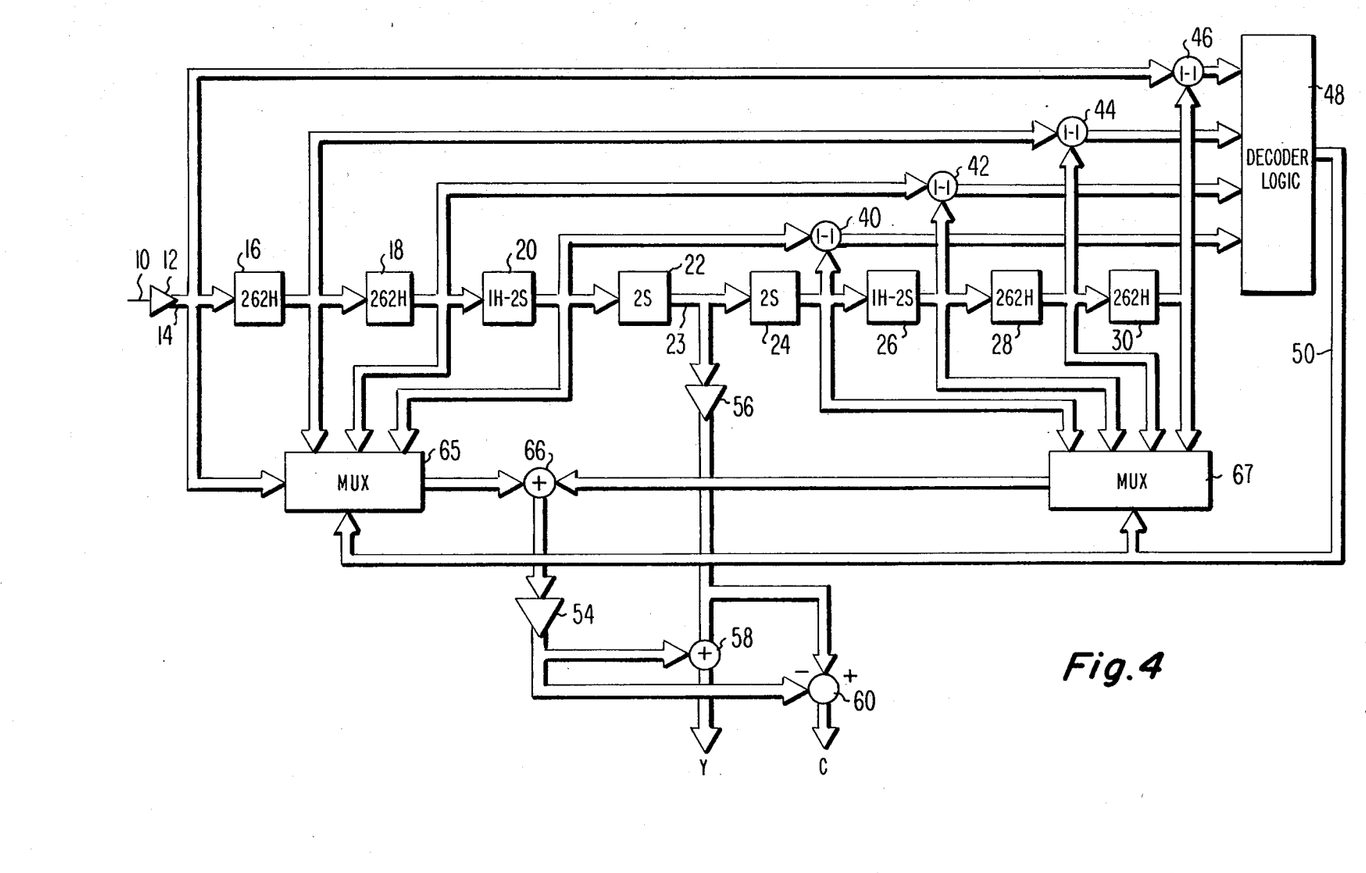

FIG. 4 shows a second embodiment of a chrominance/luminance separation system requiring less hardware than the FIG. 1 system. In the FIG. 4 embodiment the samples are selectively multiplexed to a single adder eliminating the need for three of the four adders 32–38. In the figure elements bearing like numerals to FIG. 1 perform like functions. In FIG. 4 adders 32–38 are replaced by multiplexors 65 and 67 and adder 66. Responsive to the decoder 48 the multiplexors selectively route only the samples required in the current calculations to adder 66 for averaging pairs of signals. This significantly reduces both hardware and power consumption.

Figure 5:
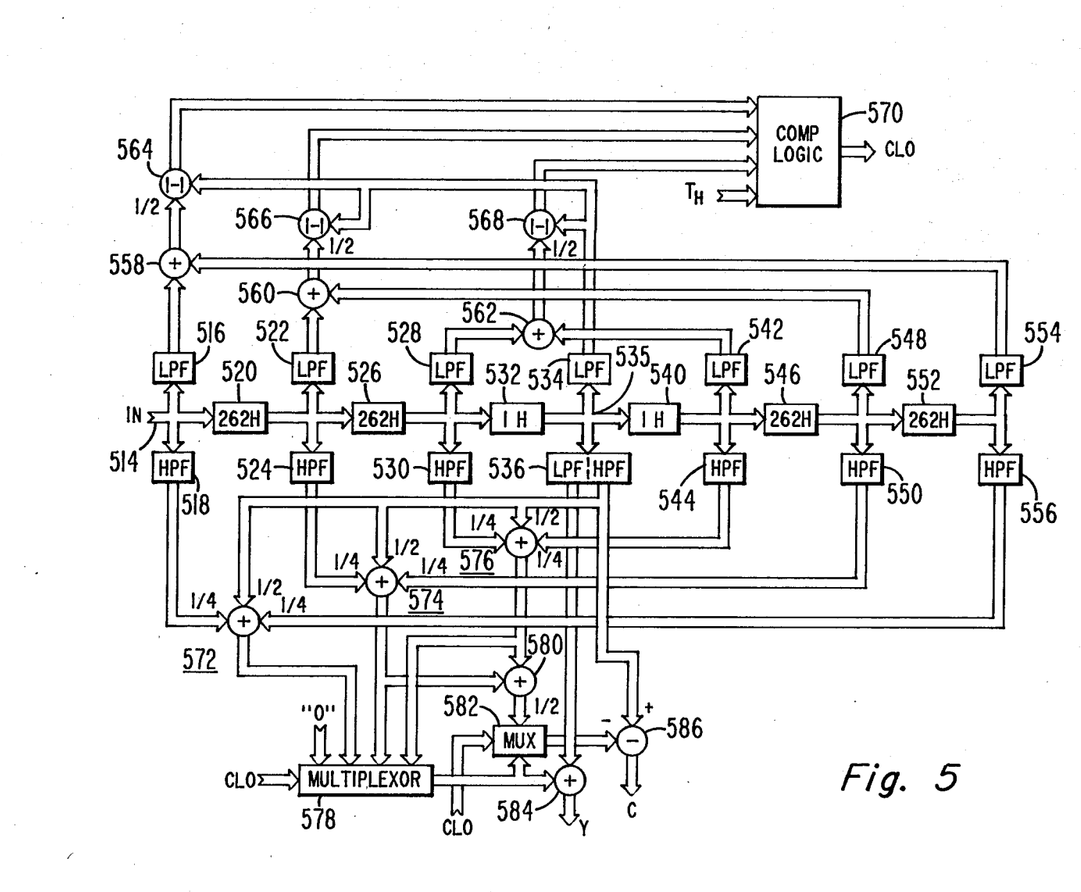

FIG. 5 is another embodiment, wherein the primary difference between it and the FIG. 1 and FIG. 4 circuits, is that the comb type filter function is performed only on that portion of the composite video signal frequency spectrum containing the chrominance signal component. The difference signals which are compared to generate the control signals are developed from that part of the composite video signal frequency spectrum which does not contain the chrominance component. In addition, the difference signals in the FIG. 5 embodiment are developed from the difference between the average of signal from pairs of symmetrically disposed taps and signal from the center tap.

In FIG. 5 composite video signal is applied at input port 514 and coupled to cascade connected delay elements 520, 526, 532, 540, 546 and 552, which provides signals delayed by one field, two field, one frame, one frame plus one line, one frame plus 263 line and two frame intervals respectively. The input and the delayed signals are applied to respective low-pass filters 516, 522, 528, 534, 542, 548 and 554 which substantially attenuate the chrominance component of the video signal. Output signals from the respective low-pass filters contain the lower frequency portion of the luminance component of the applied video signal. Low-pass filtered signals from pairs of taps, which are symmetrically disposed about the center tap 535, are summed in respective adder circuits 558, 560 and 562. The signal sums from the respective adder circuits 558, 560 and 562 are halved and coupled to respective subtraction circuits 564, 566 and 568. Low-pass filtered signal from center tap 535 is coupled to respective second input ports of subtraction circuits 564–568. Subtraction circuits 564–568 develop the magnitudes of the differences of the low-pass filtered signal from center tap 535, and the average signal from the respective pairs of taps symmetrically disposed about the center tap. The magnitude values and a threshold value are coupled to the control logic 570 which may be similar to the FIG. 2 circuitry. Control logic 570 develops an output signal, CLO, having values for controlling multiplexers 578 and 582. The output signal CLO indicates which pair of delayed signals are likely to produce the most desirable output signals Y and C, or whether none of the signals are suitable. This latter case is ascertained when the difference signals all exceed the threshold value TH.

Input signal and delayed signal from delay elements 520, 526, 540, 546 and 552 are applied to respective filters 518, 524, 530, 536, 544, 550 and 556 which pass the higher frequency portion of composite video signal containing the chrominance component and which substantially attenuate the lower frequency luminance component.

The high frequency video signals from pairs of signal taps symmetrically disposed about the center tap are combined with the high frequency video signal from the center tap in adders 572, 574 and 576. The signals applied to these adders are scaled in the proportions of one-half for signal from the center tap 535 and one-quarter for signal from the other taps in order that the output signal from each of the adders is normalized.

Output signals produced by adders 576, 574 and 572 correspond to the high frequency luminance signal from a 2-H comb filter, a 2-field comb filter and a 2-frame comb filter respectively. These output signals and a zero valued signal are coupled to respective signal input ports of the multiplexer 578. Responsive to the control signal CLO, multiplexer 578 selectively applies one of these signals to adder 584 wherein it is combined with low-pass filtered luminance signal from center tap 535 to produce full bandwidth luminance, Y.

If the control signal CLO indicates that none of the signals from the pairs of taps will produce sufficiently non-distorted luminance signal, then the zero value is coupled to adder 584. In this situation, the luminance signal provided by adder 584 will consist of low-pass filtered luminance from the center tap 535.

The comb filtered luminance signal from multiplexer 578 is coupled via a second multiplexer 582 to the subtrahend input port of subtracter circuit 586. The higher frequency portion of composite video from center tap 535 is coupled to the minuend input port of subtracter 586. The difference samples provided by subtracter 586 correspond to comb filtered chrominance signal, C.

Two options are available regarding the chrominance output signal when the control signal CLO indicates that none of the pairs of signals are likely to produce desirable output signals. The first is to allow the zero value to be coupled to the subtracter 586. In this case the chrominance output C will be contaminated with high frequency luminance, which, though undesirable, is not intolerable.

The second option indicated in FIG. 5 is to average the 2-H comb filtered luminance signal and the 2-field comb filtered signal for application to subtracter 586. The combined 2-H and 2-field comb filtered signal includes a relatively large percentage of the higher frequency composite signal. Thus, when this combined signal is subtracted from the higher frequency portion of composite from the center tap 535, the result is relatively narrow band chrominance.

Referring again to FIG. 5, 2-H comb filtered signal from adder 576 and the 2-field comb filtered signal from adder 574 are coupled to respective input ports of adder 580. The sums produced by adder 580 are scaled by one-half and applied to a second signal input port of multiplexer 582. Multiplexer 582, responsive to the control signal, CLO, selectively applies comb filtered luminance signal from multiplexer 578 or the averaged comb filtered signal from adder 580 to subtracter 586.

The low-pass filters and the filters which pass the higher frequency portion of composite video desirably should have complementary transfer characteristics with respect to the video signal spectrum. Complementary filters which may be integrated with the delay elements are described in U.S. Pat. No. 4,466,016 entitled "Television Signal Filtering System", incorporated herein by reference.

What is claimed is:

1. A system for separating chrominance and luminance components from composite video signal, said system comprising:
a signal input port for applying said composite video signal;
a plurality of cascade connected delay elements serially connected to said signal input port, having a central output tap and pairs of further output taps, the pairs of taps being symmetrically disposed about said center tap;

means coupled to said pairs of taps and responsive to a control signal for selectively producing the sum of delayed signals from a particular pair of taps to an output port thereof;

signal differencing means coupled to each of said pairs of taps for producing respective signals corresponding to the magnitude of the differences of signals occurring between each pair of taps;

decoder circuitry coupled to said signal differencing means and responsive to said magnitude difference signals for generating said control signal, said control signal selectively producing said sum of delayed signals from the pair of taps tending to produce the smallest magnitude difference signal; and signal combining means coupled to the output port of said means for producing the sum of delayed signals, and to said central tap, for combining signals to produce at least one of said separated luminance and chrominance components.

2. The system set forth in claim 1 wherein said cascade connected delay elements have pairs of taps disposed from said central taps for providing signals displaced in time from signal occurring at said central tap by time periods of an integral multiple of one-half color subcarrier period, one horizontal line period, and 263 horizontal line periods.

3. The system set forth in claim 1 wherein the means coupled to said pairs of further taps for producing the sum of delayed signals includes:

an adder circuit coupled to each pair of further taps for producing at respective output ports thereof the sum of signals occurring at said respective pair of taps;

a multiplexor having input ports coupled to said respective output ports and responsive to said control signal for selectively coupling the sum of signals from one of said adder circuits to said means for combining.

4. The system set forth in claim 1 wherein the means coupled to said pairs of further taps for producing the sum of delayed signals includes:

multiplexing means having input ports coupled to said pairs of further taps and responsive to said control signal for selectively providing signals from one pair of taps to an output port thereof; and an adder having input ports coupled to the output port of said multiplexing means for producing at an output port thereof the sum of signals from said pair of taps.

5. The system set forth in claim 1 wherein the decoder circuitry includes:

means serially coupled to said signal differencing means, for lowpass filtering at least one of said magnitude difference signals.

6. The system set forth in claim 1 wherein the decoder means includes filter means, serially coupled to said signal differencing means, for selectively passing signals representing the frequency range occupied by said chrominance component.

7. The system set forth in claim 1 wherein the decoder means includes scaling means, serially coupled to said signal differencing means for producing the magnitudes of differences.

8. The system set forth in claim 1 wherein the combining means includes:

an adder having a first input port coupled to said central tap and a second input tap coupled to the output port of said means for selectively producing the sum of delayed signals, for producing said luminance component at an output thereof; and means having first and second input ports respectively coupled to said central tap and the output port of said means for selectively producing the sum of delayed signals, for subtracting signal occurring at said second input port from signal occurring at said first input port and producing said chrominance component at an output port thereof.

9. A system for separating luminance and chrominance components from sampled composite video signal, said system comprising:

delay means responsive to said sampled composite video sample for producing delayed samples at a central output tap, and samples at pairs of further output taps, the pairs of further output taps being symmetrically disposed about said central output tap;

sample differencing means coupled to said pairs of taps for producing samples corresponding to the differences, $\Delta i$, of sample values at respective pairs of taps;

means responsive to said difference samples, $\Delta i$, for filtering and scaling ones of said samples, $\Delta i$, for generating samples $\Delta i'$;

a decoder responsive to the samples $\Delta i'$ for generating a control signal indicating the smaller of the samples $\Delta i'$;

a multiplexer coupled to said pairs of output taps and responsive to said control signal for selectively providing samples from one of said pairs of taps to an output terminal thereof; and sample combining means coupled to said central output tap and selectively coupled to one of said pairs of further output taps for producing at least one of said separated chrominance and luminance signals.

10. A system for separating luminance and chrominance components from composite video signal, comprising:

a signal input port for applying said composite video signal;

a plurality of cascade connected delay elements serially connected to said signal input port, having a central output tap and pairs of further output taps, the output taps of each pair being symmetrically disposed about said center tap;

signal differencing means coupled to each of said pairs of taps for producing respective signals corresponding to the magnitude of the value of amplitude differences of signal occurring between each pair of taps;

decoder circuitry coupled to said respective means and responsive to said magnitude of amplitude differences, for generating control signals;

means responsive to said control signals and coupled to said taps for producing an output signal corresponding to one of said luminance and chrominance components, said output signal being the linear combination of signal from said center tap and respective signals from one of the pairs of taps.

11. A system for separating the video signal components from composite video signal comprising:

a signal input port for applying said composite video signal;

a plurality of cascade connected delay elements serially connected with said signal input port, having a central output tap and pairs of further output taps, said central output tap being disposed centrally between the taps of each pair;

filter means coupled to each output tap for attenuating the relatively higher frequency spectrum of composite video signal;

a plurality of signal differencing means respectively coupled to the filter means of each of said pairs of taps and to said center tap for producing signals corresponding to the magnitude of the differences of the average of signal from respective pairs of taps and said center tap;

decoder circuitry coupled to said plurality of signal differencing means and responsive to said magnitudes for generating control signals indicating the pair of taps that produce the smallest difference;

means responsive to said control signals and coupled to said taps for producing an output signal corresponding to one of said video signal components, said output signal being the linear combination of signal from said center tap and signals from one of said pairs of taps.

12. The system set forth in claim 11 wherein the means for producing an output signal includes:

respective filter means serially coupled to each of said output taps for attenuating the relatively lower frequency spectrum of said composite video signal.

13. The system set forth in claim 11 wherein the means for producing an output signal further includes:

a plurality signal combining means respectively coupled to respective pairs of taps and said center tap for combining the relatively higher frequency spectrum of said composite video signal, each of said signal combining means providing a comb filtered output signal comprised of the linear combination of signal from said center tap and signal from one pair of taps;

means coupled to respective combining means for additively combining at least one of said comb filtered output signals with the relatively lower frequency spectrum of composite video signal from said center tap.

14. The system set forth in claim 11 wherein the means for producing an output signal further includes:

a plurality, of signal combining means respectively coupled to respective pairs of taps and said center tap for combining the relatively higher frequency spectrum of said composite video signal, each of said signal combining means providing a comb filtered output signal comprised of the linear combination of signal from the center tap and signal from one pair of taps;

means coupled to said signal combining means for subtractively combining at least one of said comb filtered output signals with the relatively higher frequency portion of composite video signal from said center tap.

15. The system set forth in claim 14 wherein the means for producing an output signal further includes:

means coupled to said plurality of signal combining means and responsive to said control signal for selectively subtractively combining a linear sum of two of said comb filtered output signals with the relatively higher frequency portion of composite video signal from said center tap.

* * * * *

REEXAMINATION CERTIFICATE (1249th)
United States Patent [19]
Reitmeier

[11] B1 4,626,895
[45] Certificate Issued Apr. 10, 1990

[54] SAMPLED DATA VIDEO SIGNAL CHROMINANCE/LUMINANCE SEPARATION SYSTEM

[75] Inventor: Glenn A. Reitmeier, Trenton, N.J.

[73] Assignee: RCA Licensing Corporation, Princeton, N.J.

Reexamination Request:
No. 90/001,724, Mar. 1, 1989

Reexamination Certificate for:
Patent No.: 4,626,895
Issued: Dec. 2, 1986
Appl. No.: 736,970
Filed: May 22, 1985

Related U.S. Application Data

[63] Continuation-in-part of Ser. No. 639,094, Aug. 9, 1984, abandoned.

[51] Int. Cl.⁴ .............................................. H04N 9/64
[52] U.S. Cl. .............................................. 358/31
[58] Field of Search .................................. 358/31

[56] References Cited

U.S. PATENT DOCUMENTS

| | | | |
|---|---|---|---|
| 2,921,124 | 1/1960 | Graham | 178/6 |
| 4,050,084 | 9/1977 | Rossi | 358/31 |
| 4,141,035 | 2/1979 | Maxemchuk et al. | 358/31 |
| 4,307,420 | 12/1981 | Ninomiya et al. | 358/136 |
| 4,343,017 | 8/1982 | Wilkinson | 358/31 |
| 4,361,853 | 11/1982 | Remy et al. | 358/167 |
| 4,376,955 | 3/1983 | Reitmeier | 358/314 |
| 4,437,119 | 3/1984 | Matsumoto et al. | 358/136 |
| 4,464,686 | 8/1984 | Reitmeier | 358/314 |
| 4,466,016 | 8/1984 | Pritchard | 358/31 |
| 4,524,423 | 6/1985 | Acampora | 358/31 |

FOREIGN PATENT DOCUMENTS

| | | |
|---|---|---|
| 58-129890 | 8/1983 | Japan . |
| 58-129891 | 8/1983 | Japan . |
| 2072991 | 10/1981 | United Kingdom . |
| 2138243 | 4/1983 | United Kingdom . |

OTHER PUBLICATIONS

Separation of NTSC Signals by Minimum Mean Square Error Filters and Adaptive Filters–IEEE Transactions on Commun., vol. Com-26, No. 5, May 1978–N. F. Maxemchuk & D. J. Sharma.

A. Kaiser, "Comb Filter Improvement with Spurious Chroma Detection", SMPTE Journal, vol. 86, No. 1, Jan. 1977, pp. 1–5.

Schönfelder, "Verbesserung der PAL-Bildqualität Durch Digitale Interframetechnik", Fernsch-und Kino Technik, vol. 38, Jan. 1984, pp. 231-238.

*Primary Examiner*—James J. Groody

[57] ABSTRACT

An adaptive system for separating chrominance and luminance components from composite video includes a delay element having a central output tap and pairs of further output taps symmetrically disposed about said further tap. Samples from each pair of taps are substractively combined, filtered and scaled. These samples are then applied to a decoder which determines the pair of taps providing the smallest filtered and scaled difference. Samples from the pair of taps generating the smallest difference and samples from the central output tap are then combined to produce either comb filtered chrominance/luminance or bandpass/lowpass filtered chrominance/liminance.

under 35 U.S.C. 307

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5–7, 9 and 11–15 is confirmed.

Claims 1–4, 8 and 10 are cancelled.

New claims 16, 17 and 18 are added and determined to be patentable.

* * * * *